United States Patent
Hillmann et al.

(10) Patent No.: US 6,658,140 B1
(45) Date of Patent: Dec. 2, 2003

(54) METHOD AND ARRANGEMENT FOR OBTAINING IMAGE INFORMATION RELATING TO SURFACE STRUCTURES

(75) Inventors: Juergen Hillmann, Jena (DE); Uwe Richter, Jena (DE)

(73) Assignee: Heimann Biometric Systems GmbH, Jena (DE)

( * ) Notice: Subject to any disclaimer, the term of this patent is extended or adjusted under 35 U.S.C. 154(b) by 0 days.

(21) Appl. No.: 09/402,360

(22) PCT Filed: Feb. 2, 1999

(86) PCT No.: PCT/EP99/00650

§ 371 (c)(1), (2), (4) Date: Dec. 16, 1999

(87) PCT Pub. No.: WO99/40535

PCT Pub. Date: Aug. 12, 1999

(30) Foreign Application Priority Data

Feb. 3, 1998 (DE) .......................... 198 04 129

(51) Int. Cl.⁷ ................................. G06K 9/00
(52) U.S. Cl. ....................... 382/127; 382/115; 382/124; 356/71; 340/5.83
(58) Field of Search ............................ 382/124, 126, 382/127, 298–300; 340/5.53, 5.83; 356/71

(56) References Cited

U.S. PATENT DOCUMENTS

| | | | | |
|---|---|---|---|---|
| 4,109,263 A | * | 8/1978 | Johnson ...................... 396/352 |
| 5,467,403 A | * | 11/1995 | Fishbine et al. ............ 382/116 |
| 5,528,355 A | * | 6/1996 | Maase et al. ................ 356/71 |
| 5,629,764 A | * | 5/1997 | Bahuguna et al. ............ 356/71 |
| 5,650,842 A | * | 7/1997 | Maase et al. ................ 356/71 |
| 5,703,958 A | * | 12/1997 | Hara ........................... 382/124 |
| 5,825,474 A | * | 10/1998 | Maase .......................... 356/71 |
| 6,185,319 B1 | * | 2/2001 | Fujiwara ...................... 356/71 |
| 6,240,200 B1 | * | 5/2001 | Wendt et al. ................. 359/15 |
| 6,330,345 B1 | * | 12/2001 | Russo et al. ................ 382/115 |

OTHER PUBLICATIONS

Patent Abstract of Japan, vol. 013, No. 019 (P–814) Publ. No. & date: 63–223888 Sep. 19, 1988 (Shinsaibi Denki KK, et al.).

* cited by examiner

*Primary Examiner*—Jingge Wu
*Assistant Examiner*—Ryan J. Hesseltine
(74) *Attorney, Agent, or Firm*—Reed Smith LLP

(57) ABSTRACT

A method for obtaining image information, for example, about the surface structure of the inside surface of a hand, the edge of a hand, the extended four fingers or an extended thumb with high image quality. The surface to be recorded is placed on a scanning surface and an image of this surface is recorded by means of a beam path.

The scanning surface has an aspect ratio $B_A:H_A<1$. The aspect ratio of the image is changed during optical transmission from the scanning surface to the optoelectronic image converter, wherein the height is compressed in such a way and/or the width is expanded in such a way that an image which is optically distorted to the aspect ratio of $B_E:H_E>1$ reaches the reception surface of the image converter, wherein the optically distorted image is then rectified by a computational operation. An arrangement for carrying out the method is also disclosed.

18 Claims, 4 Drawing Sheets

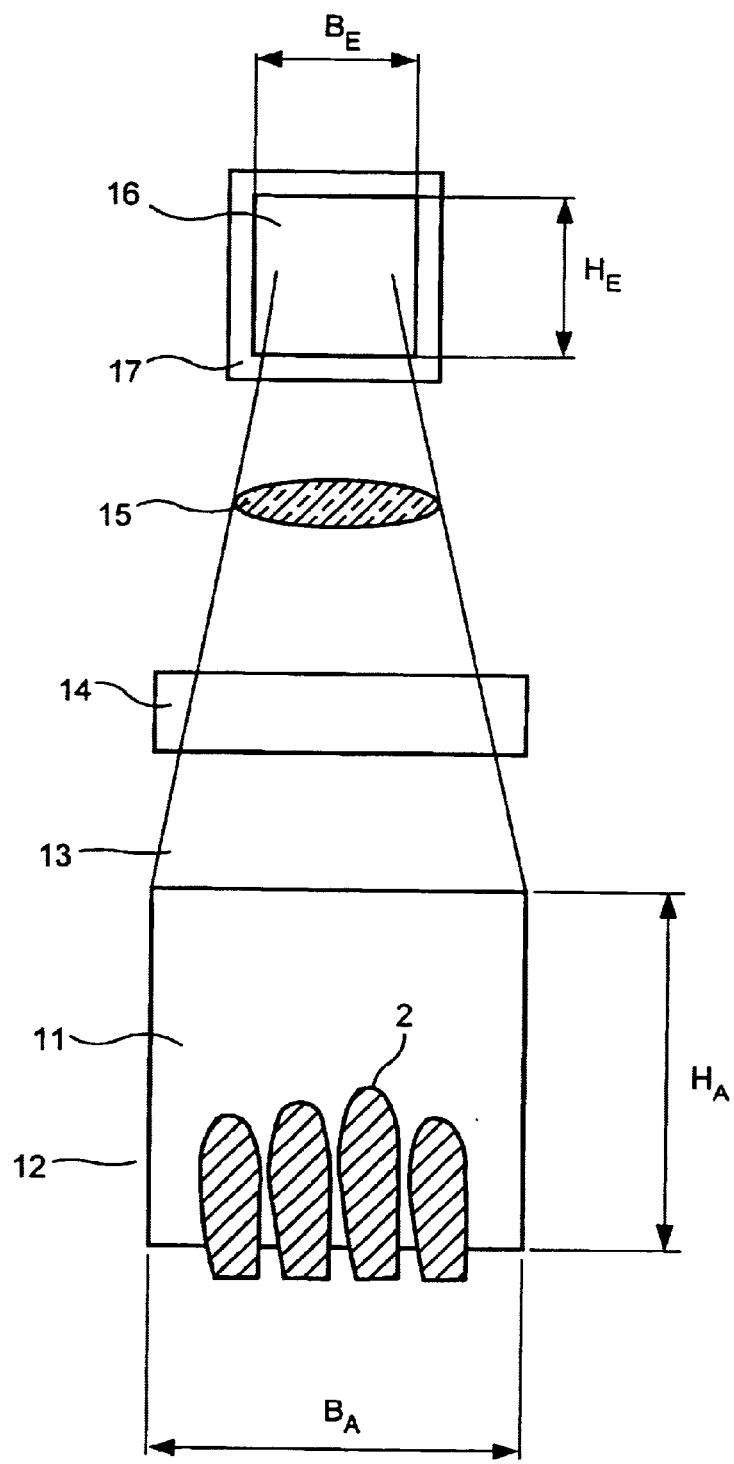
F I G. 2

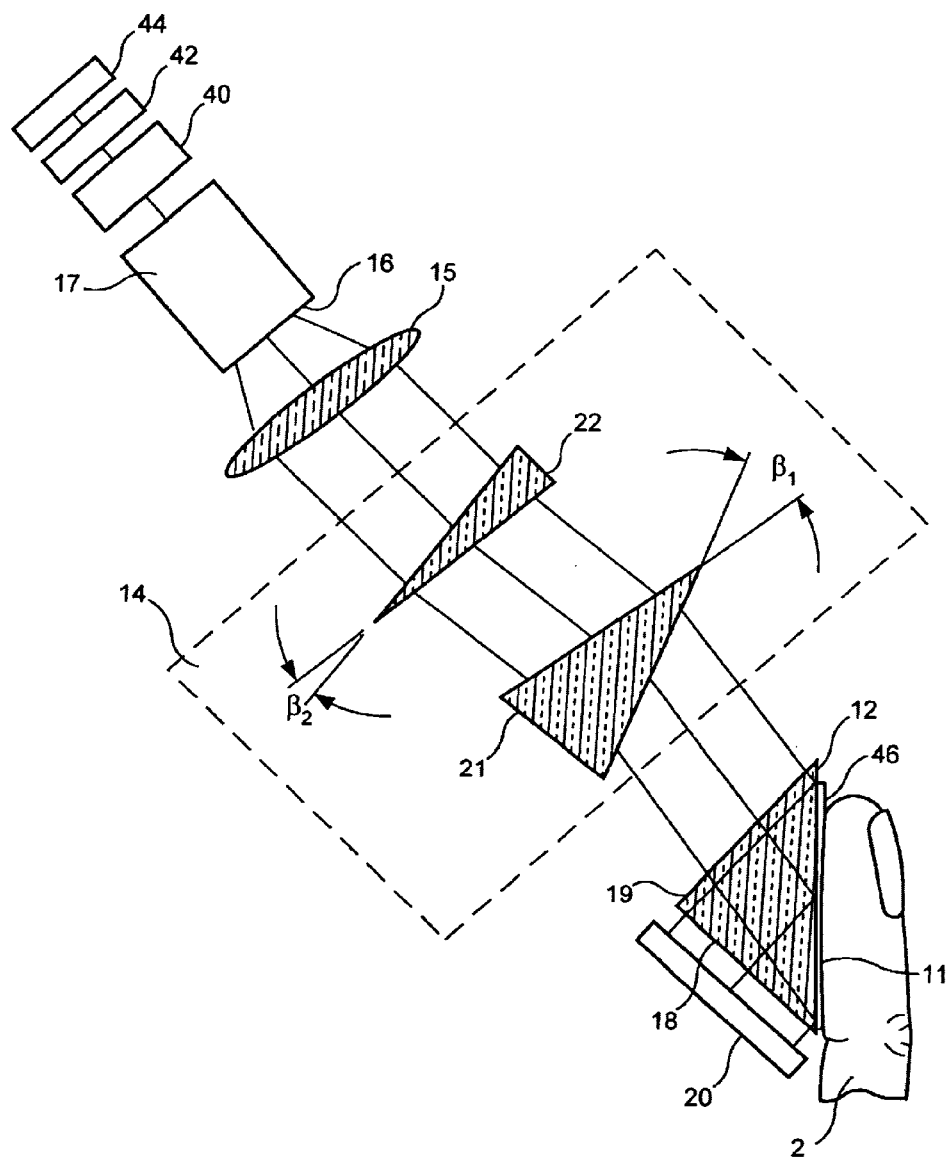
F I G. 3

METHOD AND ARRANGEMENT FOR OBTAINING IMAGE INFORMATION RELATING TO SURFACE STRUCTURES

BACKGROUND OF THE INVENTION a) Field of the Invention

The invention is directed to a method for obtaining image information, for example, about the surface configuration or surface structure of the palm or inside surface of a hand, the edge of a hand, the extended four fingers or an extended thumb, wherein the object to be recorded is placed on a scanning surface, an image of the surface structure is recorded with an illumination beam path directed onto the scanning surface and reflected by the scanning surface, and this image is subsequently projected onto the reception surface of an optoelectronic image converter. The invention is further directed to an arrangement for carrying out the method.

b) Description of the Related Art

Capture of impressions for the traditional formats consisting of rolled individual fingers, flat, plain (not rolled) four extended fingers of the hand which are to be captured simultaneously, and flat, plain (not rolled) extended thumb is known in the art. The size of the scanning surface is typically about 40 mm×40 mm for rolled individual fingers and about 75 mm×58 mm for flat simultaneous impressions of the four extended fingers. The optoelectronic scanning devices are adapted to these formats.

The capture of impressions of the kind mentioned above or of the pattern of papillary lines is based on the fundamental optical principle of frustrated total reflection. In known optoelectronic processes and arrangements, this basic principle is applied essentially by adapting to the specific conditions of the available image converters which usually take the form of CCD cameras. At the same time, this also results in the need for adapting to the limited quantity of light-sensitive sensors available in the image converter in the horizontal and vertical directions with respect to optical requirements.

DE 34 21 220 C2 describes a device for the capture, examination and identification of fingerprints in which a distortion-free optical imaging of the fingerprint is carried out on the light-receiving surface of a TV camera. The aspect ratio of the finger scanning surface is transmitted unchanged to the sensor of the TV camera by means of the special optical arrangement wherein deflecting prisms for anamorphotic magnification of the fingerprint and for compensation of astigmatism are provided between the reflecting prism and the image-side end part of the device.

It is disadvantageous in this arrangement that the need to provide a distortion-free optical arrangement can result in prisms with very small angles which are technologically difficult to produce and whose use in the device, moreover, leads to problems with respect to adjustment and image quality because of very strict permissible tolerances.

U.S. Pat. No. 5,650,842 describes an optical arrangement which is directed exclusively to the recording of four fingers simultaneously. The rectangular format of the finger scanning surface is imaged on a CCD camera with an extreme aspect ratio of about 1.6:1 by a special optical arrangement in such a way that the image matches the aspect ratio of the sensor surface by approximately 1.33:1. This strong optical distortion in the horizontal direction by a factor of 0.831 is compensated subsequently during readout of the analog image signals prepared by the CCD camera with oversampling by a factor of 1.203.

This procedure is disadvantageous in that, in order to obtain a clean signal shape, the analog signal must be sharply defined in its bandwidth so that no interference occurs in the oversampled digital image signal. This has a negative effect on optical resolution in the horizontal direction. Also, in the above-cited reference the imaging beam path is guided away from the finger scanning surface in the direction of the vertical axis of the image. However, the device housing must therefore be disadvantageously increased in size toward the front, i.e., toward the user, and a vertical closing surface must be provided, which greatly encumbers accessibility particularly when recording the flat extended thumb, or even renders capture impossible in the case of persons with limited articulation of the fingers.

An essential requirement in the capture of fingerprints, above all in law enforcement entities, is to generate images of the highest optical quality so as to provide the foundation for the input and use of the images in automatic fingerprint and hand-impression identification systems and to ensure a high rate of hits in the comparison with images which are already stored.

For this reason, spatial resolution may not fall below a minimum and geometric distortion may not exceed a maximum. A high spatial resolution is important for clear, sharp visibility of even fine structures in the papillary lines; reduced distortion offers the assurance of definite determination of the characteristic features, the minutiae, as they are called. Further, a good image contrast is a further prerequisite.

There is also an increasing desire on the part of users of identification systems of the type mentioned above to be able to capture images of the inside surface, the edge of the hand, the extended thumb, the extended four fingers, etc. with only one device and also with one and the same scanning surface present in this device, so that it is no longer necessary to have available a plurality of different application-specific devices in order to carry out all of the tasks performed by entities concerned with identification.

The solutions available in the prior art up to this point are not suitable for comprehensively meeting the above-mentioned requirements.

OBJECT AND SUMMARY OF THE INVENTION

Proceeding from the prior art, it is the primary object of the invention to further develop a method of the kind described above in such a way that the flat or plane image of the inside surface of a hand and/or the edge of a hand and/or the extended four fingers and/or extended thumb is generated by one and the same scanning surface with high image quality and in a comfortable manner for the person in question.

According to the invention, this object is met in that the image of the surface structure is recorded with an aspect ratio $B_A:H_A<1$, wherein the fingers of the hand placed on the scanning surface are oriented parallel to height $H_A$, the aspect ratio of the image is changed during the optical transmission from the scanning surface to the optoelectronic image converter, wherein the height is compressed in such a way and/or the width is expanded in such a way that an image which is optically distorted to the aspect ratio of $B_E:H_E>1$ reaches the reception surface, the optically distorted image is then converted into electronic image information, wherein exactly one analog or digital value is obtained for every output signal of an individual sensor, and the electronic image information then undergoes a calculated or computational change in the aspect ratio, wherein the height is computationally expanded and/or the width is computationally compressed until the original aspect ratio $B_A:H_A<1$ has been restored.

In this way, it is possible to utilize a scanning prism whose scanning surface is sufficiently large to capture the entire inside surface of the hand. By means of preferably anamorphotic optics arranged after the scanning surface, the aspect ratio of the optical image recorded by this scanning surface is distorted in a defined manner by expanding and/or compressing and is directed via an imaging objective to the reception surface (for example, of a CCD camera), where the optical image information is converted to analog electronic image information, wherein, according to the invention, the aspect ratio is not changed.

Subsequently, the analog electronic image information is digitized. In contrast to the prior art, this is done in such a way that exactly one digital value is formed for every unit of analog image information read out of an individual light-sensitive CCD sensor. Accordingly, an image point-synchronized digitization is carried out while maintaining the distortion with which the image impinges on the reception surface.

The image which is now in digital form is compressed in the direction in which it was formerly optically expanded and/or is expanded in the direction in which it was formerly optically compressed, wherein the compression factor exactly compensates for the defined distortion of the image aspect ratio brought about by the anamorphotic optics. This results in a digital, distortion-free image of the papillary lines of the hand.

The advantage consists in that it is possible to record with high optical resolution the plane image of the inside surface of a hand and/or the edge of a hand and/or the extended four fingers and/or the extended thumb with only one camera and with optical components that are fixed with respect to the device. The resolution which can be achieved in this way not only satisfies, but exceeds the quality standard of 500 pixels/inch currently demanded for application in law enforcement identification entities, for example.

In an advantageous development of the invention, the image is captured by a scanning surface with an aspect ratio of $B_A:H_A=0.92$ and the aspect ratio of the image is changed in the course of optical transmission from the scanning surface to the sensor reception surface to an aspect ratio of $B_E:H_E=1.04$. The change in the aspect ratio of the image on the way from the scanning surface to the reception surface is preferably carried out by means of anamorphotic optics or an anamorphotic optical subassembly comprising three prisms and an objective.

In a preferred development of the invention, the compression of the height and/or the expansion of the width of the digitized image is carried out computationally by interpolation. The image can then be read out visually via a monitor or stored as a data record and reused at a later time.

In contrast to the prior art, apart from the differences in the manner of optical distortion of the image in the beam path between the scanning surface and the sensor reception surface, the optical distortion is not compensated by oversampling the image information present at the sensor output, but rather an image point-synchronized digitization is first carried out and then the quantity of image information is reduced computationally, preferably by interpolation, and, therefore, the resolution is adapted to the required target resolution.

Further, it is provided in a development of the invention that the plane image of the fingerprint or hand-impression is obtained by means of the principle of frustrated total reflection. In this connection, the plane image is obtained from the points on the scanning surface which are in contact with the raised structures of the hand or fingers.

Alternatively, the image can also be obtained from the diffuse reflection of the illumination light of the portions of the scanning surface which are in contact with the raised structures of the hand.

It is a further object of the invention to provide an arrangement which does not have the disadvantages of the arrangements known from the prior art and which achieves a high optical resolution in both coordinates of the plane image.

According to the invention, this object is met in that the scanning surface and the captured image of the surface structure have an aspect ratio of $B_A:H_A<1$, in that at least one optical subassembly influencing the aspect ratio of the image is provided in the illumination beam path reflected from the scanning surface, wherein an optical expansion of the width and/or an optical compression of the height and accordingly an optical distortion of the image to an aspect ratio of $B_E:H_E>1$ is carried out by means of this optical subassembly, in that the individual sensors of the optoelectronic image converter are followed by analog-to-digital converters for converting the output signals into exactly one digital value in each instance and by a computing unit in which the width is computationally compressed and/or the height is computationally expanded and, therefore, a rectification of the image to the original aspect ratio $B_A:H_A<1$ is carried out.

In an advantageous manner, aspect ratio $B_A:H_A=0.92$ and aspect ratio $B_E:H_E=1.04$. Accordingly, it can be provided, for example, that the scanning surface is constructed with a width $B_A$ of 120 mm and a height $H_A$ of 130 mm and the optoelectronic image converter is a CCD camera which has a reception surface with an aspect ratio of $B_E:H_E=1.04$ or in which a reception surface with an aspect ratio $B_E:H_E=1.04$ can be utilized.

The optical subassembly influencing the aspect ratio of the image is preferably constructed as anamorphotic optics with two prisms and an objective. This enables a simple construction of the device arrangement with uncomplicated structural component units which are simple to manufacture in terms of technology.

In a particularly preferred development of the invention, the reception surface of the CCD camera is formed of 3072×3072 individual sensors which are arranged in a two-dimensional raster, wherein the raster spacing between the individual sensors is identical in both dimensions. A partial surface of the sensors with the above-indicated aspect ratio $B_E:H_E=1.04$ can be used, for example.

The arrangement according to the invention is further developed in such a way that the outputs of the individual sensors are applied, via analog-to-digital converters, to the computing unit which has a digital computing circuit for compressing and/or expanding the quantity and values of the image signals in both coordinates of the plane image by interpolation.

In another advantageous development of the arrangement according to the invention, the radiating direction of the illumination beam within a scanning prism is inclined at an angle α toward the scanning surface, which makes it possible to obtain the image according to the principle of frustrated total reflection.

It is further advantageous when a directional component of the radiated illumination beam path and of the imaging beam path is oriented parallel to the direction of height $H_A$ of the scanning surface. This satisfies an important criterion for the user-friendly arrangement of a scanning device.

It is also possible to couple the recording prism with a heating device 46 by means of which the support surface for the hand or fingers is preheated to a temperature that prevents condensation of the transpiration of the skin in a cool environment.

BRIEF DESCRIPTION OF THE DRAWINGS

In the following, the invention will be described more fully with reference to an embodiment example. Shown in the accompanying drawings are:

FIG. 2 illustrates an arrangement according to the principle of the invention;

FIG. 3 is a side view of the arrangement according to FIG. 2;

DESCRIPTION OF THE PREFERRED EMBODIMENTS

Figure 1:
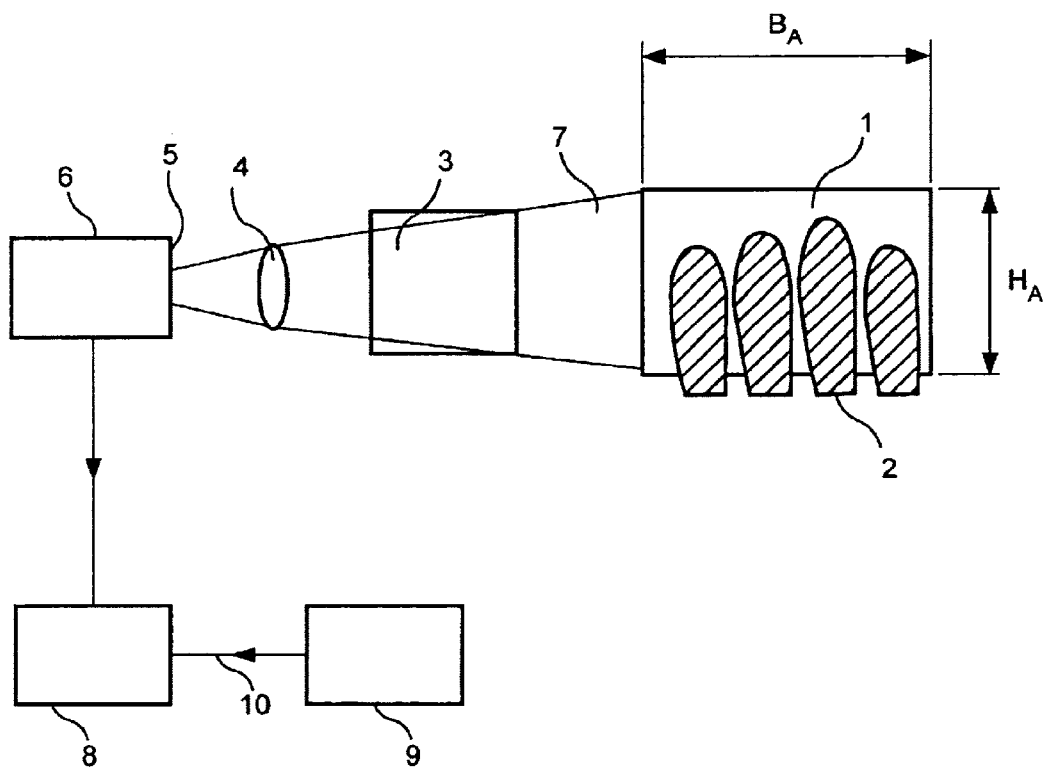
FIG. 1 illustrates an arrangement according to the known prior art.

An arrangement for recording four fingers simultaneously, as is described in U.S. Pat. No. 5,650,842, is shown schematically in FIG. 1. In this case, the plane image of the fingers 2 placed on a scanning surface 1 is imaged on the light-sensitive reception surface 5 of a camera 6 by means of anamorphotic optics comprising a prism arrangement 3 and an imaging objective 4. The imaging beam path 7 extends normal to the height $H_A$ of the scanning surface 1 and, accordingly, normal to the direction of the extended fingers 2.

The scanning surface 1 has a rectangular shape with a width $B_A$ of 3.2 inches and a height $H_A$ of 2 inches and consequently has an aspect ratio of $B_A:H_A \approx 1.6$. The light-sensitive reception surface 5 of the camera 6 has a format or size of roughly 1300 image points with respect to width $B_E$ and 1000 image points with respect to height $H_E$ and accordingly has an aspect ratio $B_E:H_E \approx 1.3$. The anamorphotic prism arrangement 3 adapts the format of the finger scanning surface with aspect ratio $B_A:H_A = 1.6$ to the format of the light sensitive reception surface 5 with $B_E:H_E \approx 1.3$ by compression in the horizontal by a factor of 0.83.

The analog image signals travel from the camera 6 to an analog-to-digital converter 8 whose scanning is controlled by a clock generator 9. The frequency of the clock signal 10 is selected in a ratio to the readout timing of the analog image signal such that, by oversampling, 1600 scans are taken from width $B_E$ and there is accordingly formed a digital image with an unchanged quantity of 1000 image points from height $H_E$, but with an increased quantity of 1600 readout values from width $B_E$.

Accordingly, in this case, the results are not determined in a pixel-synchronous manner. Due to the fact that the side length of the scanning surface of 3.2 inches is translated to 1300 pixels of the reception surface, there results a resolution of approximately 406 pixels/inch. This resolution can also not be increased by increasing the 1300 image information units obtained from the pixels per side length $B_E$ to 1600 values in the manner described above, because there are still only 1300 different image information units contained in the 1600 values.

In contrast to this prior art, FIG. 2 shows a schematic view of the arrangement according to the invention. A scanning prism 12 is outfitted with a scanning surface 11 having a width $B_A$ and a height $H_A$ differing from the latter, wherein width $B_A$ is less than height $H_A$ and, consequently, the aspect ratio is $B_A:H_A < 1$. The fingers 2 are placed parallel to the direction of height $H_A$. By way of beam path 13, which (in contrast to the prior art) is oriented parallel to the direction of the fingers 2, the flat image of the surface structures of the fingers 2 reaches the optical correction unit 14 and then, via a lens arrangement 15, arrives at the rectangular reception surface 16 of an optoelectronic image converter 17, preferably the reception surface 16 of a CCD camera.

FIG. 3 shows a side view of the schematic illustration from FIG. 2. In FIG. 3, the scanning prism 12 is outfitted with the scanning surface 11, a radiating surface 18 and an output surface 19. Opposite the radiating surface 18 there is arranged a flat illumination source 20 which is advantageously formed as a two-dimensional arrangement of a plurality of light-emitting diodes (LEDs) followed by a diffuser. The illumination source 20 serves for internal illumination of the scanning prism 12 and scanning surface 11 in such a way that an image of the surface structure and, therefore, of the characteristics of the fingers and/or other surface portions of the hand is recorded according to the principle of frustrated total reflection.

FIG. 3 further shows that the correction unit 14 is formed of two correction prisms 21 and 22. The arrangement of the correction prisms 21, 22 in relation to the scanning prism 12 and their prism angles $\beta_1$ and $\beta_2$ is selected in such a way that a change in the aspect ratio of the flat image of the surface structure is carried out by anamorphotic magnification in that the width is expanded so that it is subsequently greater than the height.

This has the intended result that an image which is expanded in one direction, namely in the direction of width B, and which is therefore distorted, impinges on the rectangular reception surface 16 of the optoelectronic image converter 17. Accordingly, a distorted image with aspect ratio $B_E:H_E > 1$ is formed in the plane of the reception surface 16.

The image of the surface structure which is distorted in this way is converted to analog image information by means of the optoelectronic image converter 17. The conversion is preferably carried out, according to the CCD principle, with a light-sensitive, two-dimensional array of individual sensors. The individual sensors are advantageously arranged equidistant from one another in a square raster, as measured in each instance from center point to center point of two adjacent individual sensors. The aspect ratio $B_E:H_E > 1$ of the distorted image is retained in the conversion of the optical image signals to analog electronic image signals.

In other words, the side length of the scanning surface 11 designated by width $B_A$ is projected onto the side length of the reception surface 16 designated by width $B_E$, while the side length of the scanning surface 11 designated by height $H_A$ is directed to the side length of the reception surface 16 designated by height $H_E$, wherein the aspect ratio of $B_A:H_A < 1$ is changed to $B_E:H_E > 1$ and an optically distorted analog image is present at the sensor output.

Further, in an analog-to-digital converter 40 following the optoelectronic image converter 17, the analog image signals are digitized synchronous with the information of every individual sensor and only after digitizing is the aspect ratio $B_E:H_E>1$ of the flat image changed by compression in the direction of width B until the original aspect ratio of $B_A:H_A<1$ is achieved again. This compression is advantageously carried out by means of a digital computing A unit 42 through exercise of an interpolation function. An image whose aspect ratio corresponds to the aspect ratio $B_A:H_A<1$ of the scanning surface 11 is available at the output of this digital computing unit. A distortion-free reproduction with high image quality is ensured in this way. The image can then be read out via a monitor 44 or stored as a data record and reused at a later time.

It lies within the scope of the invention that the entire available width B and/or the entire available height H of a commercially available or standardized total sensor surface is not used, but rather it can be provided in an advantageous manner that the optical transmission from the scanning surface 11 to the total sensor surface is carried out in such a way that the utilized reception surface of width $B_E$ and height $H_E$ corresponds to only a portion of the total sensor surface. In this way, depending on the actual proportions with respect to the height, a quantity of image points given by the difference $H-H_E$ and/or by the difference $B-B_E$ can remain unused, as will be shown in the following.

When the aspect ratio is carried out such that $B_A:H_A=120$ mm:130 mm≈0.92 and an optoelectronic image converter 17 with a total of 3072×3072 individual sensors or pixels, respectively, is used, the image taken from the scanning surface 11 can be directed, for example, to a partial surface of the sensor with aspect ratio $B_E:H_E=2704$ pixels:2600 pixels=1.04.

After the readout of the partial surface of the sensor used for projection, there results an optically distorted image formed of 2704×2600 analog image information units. Let $B_A=120$ mm≈4.72 inches, then this corresponds to an optical resolution of 508 pixels/inch.

In the next method step, the optically distorted image is first digitized, namely, synchronous with the image information of every individual image sensor, so that there is exactly one digital value for every image information unit coming from a light-sensitive individual sensor. Accordingly, in contrast to the prior art, an image point-synchronous digitization is carried out, after which there is a data record of 2704×2600 values in the selected example.

First, the image which is still distorted in the form of such a data record is compressed again in the width direction computationally as was described above, wherein the provided compression factor corresponds exactly to the distortion brought about previously by the anamorphotic optics, so that this distortion is compensated. This results in a distortion-free digital image of the recorded surface structure.

Accordingly, there are now 2400 values available for width $B_A=120$ mm and 2600 values available for height $H_A=130$ mm, which corresponds to a resolution of 508 dpi with reference to the width $B_A$ and a resolution of 508 dpi with respect to the height $H_A$.

The aspect ratio of the digital image is accordingly identical to the aspect ratio of the image recorded by the scanning surface.

Of course, it lies within the scope of the invention to utilize a partial surface of the sensor other than that in the example in which $B_E:H_E=2704$ pixels:2600 pixels=1.04; for example, $B_E:H_E=2858$ pixels:2600 pixels=1.1, or the like. This is, at the same time, one of the essential advantages of the present invention over the prior art: the anamorphotic optics can be arranged in an optimum manner with respect to its optical characteristics and also from the point of view of technology; the variation width in the arrangement of the anamorphotic optics is no longer restricted, as was the case in the prior art, by the necessity of translating the side lengths of the scanning surface (3.2×2 inches) into the side lengths of the total sensor surface (1300×1000 pixels) so as to fully exploit the possible optical resolution. Namely, in addition to solving the problems mentioned above (high resolving accuracy along with a large scanning surface), the optical subassemblies are also optimized according to the invention.

Figure 4:
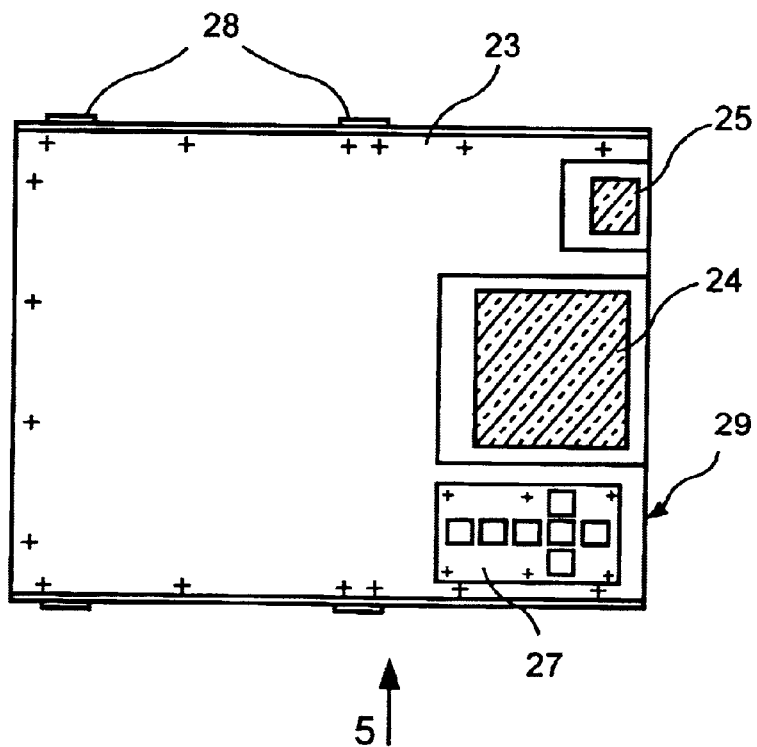
FIG. 4 illustrates a device for recording hand-impressions and fingerprints based on the invention.

FIG. 4 shows a device configuration which is suitable for carrying out the method according to the invention based on the arrangement described above. In this case, the subassemblies essential to operation for recording fingerprints or hand-impressions are installed in a tight housing 23. The top view in FIG. 4 shows the upper side of the housing 23 on which the rectangular optical scanning surfaces 24, 25 of two scanning prisms are located. The smaller prism has a scanning surface 25 of roughly 40 mm×40 mm or less and serves to record rolled or flat fingerprints. The larger prism has a scanning surface 24 of approximately 120 mm×130 mm and serves to record the inside surfaces of hands as well as fingers to be recorded simultaneously.

Figure 5:
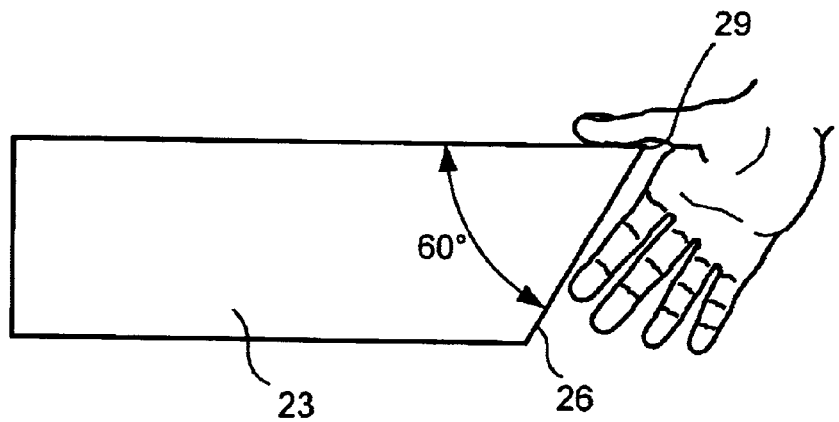
FIG. 5 is a view A from FIG. 4.

The device has two optical systems which are connected inside of the housing 23 with the scanning surfaces 24, 25. The front surface 26 of the device is inclined by an angle of approximately 60 degrees toward the interior of the device, which results in improved ergonomics with respect to rolling fingers on the scanning surface 24 by the user. Moreover, this inclination of the front surface 26 results in better handling compared with the prior art with respect to placement of the thumb or simultaneous placement of both thumbs on the larger scanning surface 24 because the other four fingers of one or both hands can be held under the front upper edge 29 of the device in conformity to the inclination of the front surface 26, as is shown in FIG. 5. This accommodates the limited movability of the human hand.

The device is operated by means of a flat keypad 27 which is integrated in the top of the housing 23. Mounting elements 28 which serve to fasten the device at the place of use, for example, are provided at the two lateral defining surfaces. By means of the mounting elements 28, it is possible to set the device at different working heights, as needed, in a cabinet of suitable design, so as to meet the requirements of the user for a hand and finger scanner that can be adjusted in a flexible manner with respect to height. Alternatively, because of the closed construction of the housing 23, the device can also be used on a table top.

While the foregoing description and drawings represent the present invention, it will be obvious to those skilled in the art that various changes may be made therein without departing from the true spirit and scope of the present invention.

What is claimed is:

1. A method for obtaining image information about the surface structure of the inside surface of a hand, the edge of a hand, four fingers and/or a thumb, comprising the steps of:

placing the surface portion in question on a scanning surface with width $B_A$ and height $H_A$ of a scanning prism;

recording an image of the surface structure by a beam path which is directed internally onto the scanning surface and reflected surface by the scanning surface;

subsequently projecting said image onto a rectangular reception surface of an optoelectronic image converter formed of a plurality of individual sensors, said rectangular reception surface having width $B_E$ and height $H_E$ and an aspect ratio $B_E:H_E>1$;

said recording of the image of the surface structure being made with an aspect ratio $B_A:H_A<1$, wherein the fingers of the hand placed on the scanning surface are oriented parallel to height $H_A$;

increasing the width to height aspect ratio of the image during the optical transmission from the scanning surface to the optoelectronic image converter, such that an image which is optically distorted to the aspect ratio of $B_E:H_E>1$ reaches the reception surface; and converting the optically distorted image into electronic image information, wherein exactly one analog or digital value is obtained for every output signal of an individual sensor, and the electronic image information then undergoes a computational change in the aspect ratio, wherein the height is computationally expanded and/or the width is computationally compressed until the original aspect ratio $B_A:H_A<1$ has been restored.

2. The method according to claim 1, wherein the image is captured by a scanning surface with an aspect ratio of $B_A:H_A=0.92$ and the aspect ratio of the image is changed in the course of optical transmission from the scanning surface to the sensor reception surface to an aspect ratio of $B_E:H_E=1.04$.

3. The method according to claim 1, wherein the aspect ratio of the image is changed on the way from the scanning surface to the reception surface by means of an anamorphotic optical assembly comprising three prisms and an objective.

4. The method according to claim 1, wherein the computational compression of the height and/or the computational expansion of the width is carried out by interpolation of the electronic image signals.

5. The method according to claim 1, wherein the image taken off at the output of the computing unit with the aspect ratio of $B_A:H_A<1$ is read out visually via a monitor.

6. The method according to claim 1, wherein the image is obtained from the points on the scanning surface which are in contact with the raised structures of the hand or fingers according to the principle of diffuse reflection in front of a dark background.

7. The method according to claim 1, wherein the image is obtained from the points of the scanning surface which are in contact with the raised structures of the hand by the principle of frustrated total reflection.

8. An arrangement for obtaining image information about the surface structure of one or more fingers and/or the inside surface of the hand, comprising:

a scanning prism having a scanning surface with width $B_A$ and height $H_A$ on which the fingers and inside surface of the hand can rest;

an illumination source whose beam path inside the scanning prism is directed onto the scanning surface at an angle $\alpha$; and an optoelectronic image converter having a reception surface formed of a plurality of individual sensors and at least a width $B_E$ and at least a height $H_E$ with an aspect ratio $B_E:H_E>1$ and which is arranged in the beam path reflected by the scanning surface;

said scanning surface and the captured image of the surface structure having an aspect ratio of $B_A:H_A<1$;

at least one optical subassembly influencing the aspect ratio of the image being provided in the illumination beam path reflected from the scanning surface;

wherein an increase in the width to height aspect ratio and accordingly an optical distortion of the image to an aspect ratio of $B_E:H_E>1$ is carried out by said optical subassembly;

individual sensors of the optoelectronic image converter being followed by analog-to-digital converters for converting the output signals into exactly one digital value in each instance; and a computing unit in which a computational compression of the width and/or a computational expansion of the height and, therefore, a rectification of the image to the original aspect ratio $B_A:H_A<1$ is carried out.

9. The arrangement according to claim 8, wherein aspect ratio $B_A:H_A=0.92$ and aspect ratio $B_E:H_E=1.04$.

10. The arrangement according to claim 8, wherein the scanning surface is constructed with a width $B_A$ of 120 mm and a height $H_A$ of 130 mm, and the optoelectronic image converter is a CCD camera from which a reception surface with an aspect ratio of $B_E:H_E=1.04$ is used, and the optical subassembly is constructed as anamorphotic optics with two prisms.

11. The arrangement according to claim 8, wherein the reception surface is formed of individual sensors which are arranged in a two-dimensional square raster.

12. The arrangement according to claim 11, wherein an electronic image signal in analog form is present at the output of every individual sensor, the individual sensors are followed by at least one analog-to-digital converter, and the computing unit has a digital computing circuit for reducing and/or increasing the quantity and values of the image signals by interpolation.

13. The arrangement according to claim 8, wherein the internal radiating direction of the illumination beam is inclined at an angle $\alpha$ toward the scanning surface in such a way that it is possible to obtain the image of the surface structure according to the principle of frustrated total reflection, and in that a directional component of the radiated illumination beam path and of the imaging beam path is oriented parallel to the height $H_A$ of the scanning surface.

14. The arrangement according to claim 8, wherein the computing unit is followed by a monitor for readout of a visible image.

15. The arrangement according to claim 8, wherein the recording prism is coupled with a heating device by which the support surface is heated to a temperature that prevents condensation of the transpiration of the skin in a cool environment.

16. A fingerprint imaging system comprising:

a scanning surface having a first width and first height on which one or more fingers rest;

an illumination source that illuminates the scanning surface at an angle;

anamorphotic optics that receives the image of the fingers from the illumination reflected from the scanning surface and optically distort the received image by increasing the first width to first height aspect ratio of the received image;

an optoelectronic image converter having a reception surface including a plurality of sensors that receives the distorted image;

A/D converter operable to convert the output of the optoelectronic image converter into a digital signal such that there is a one to one correspondence between each sensor output and each digital value; and a processor operable to receive the output of the A/D converter and restore the first width to first height aspect ratio of the image.

17. The fingerprint imaging system according to claim 16, wherein the anamorphotic optics increases the aspect ratio by expanding the image in the direction of the first width.

18. The fingerprint imaging system according to claim 16, further comprising:

a monitor coupled to the processor to display the image with the restored aspect ratio; and a heater coupled to the scanning surface.

* * * * *